United States Patent

[11] 3,631,905

[72] Inventor Bengt Haldo Karlin
 Alfta, Sweden
[21] Appl. No. 22,227
[22] Filed Mar. 24, 1970
[45] Patented Jan. 4, 1972
[73] Assignee Ostbergs Fabriks AB
 Alfta, Sweden

[54] ARRANGEMENT FOR FELLING AND STACKING TREES FOR TRANSPORT
2 Claims, 2 Drawing Figs.

[52] U.S. Cl. .................................. 144/3 D,
 144/34 E
[51] Int. Cl. ........................................ A01g 23/02
[50] Field of Search ............................. 144/3 D, 34
 R, 34 E, 309 AC

[56] References Cited
UNITED STATES PATENTS
3,102,563 9/1963 Horncastle .................. 144/3 D
3,140,736 7/1964 Propst ......................... 144/3 D
3,294,131 12/1966 Larson ........................ 144/34 E FOREIGN PATENTS
311,576 7/1969 Sweden ....................... 144/34 E Primary Examiner—Gerald A. Dost
Attorney—Pierce, Scheffler and Parker ABSTRACT: The invention refers to an arrangement for felling and stacking trees for transport, using a vehicle for driving a stacking support and having a horizontally swingable and vertically adjustable boom provided at its end with a felling unit. Hitherto at least two men have been necessary for this work, one for the felling and one for the stacking work. According to the invention, only one man, the driver of the vehicle, is required who from the driver's seat can select a tree to be felled and by means of a rotatable felling unit so direct the fall of the tree that its top approximately falls to the longitudinal extension of the support centerline, whereafter he can lift the root end of the tree for pulling the tree towards and onto the support.

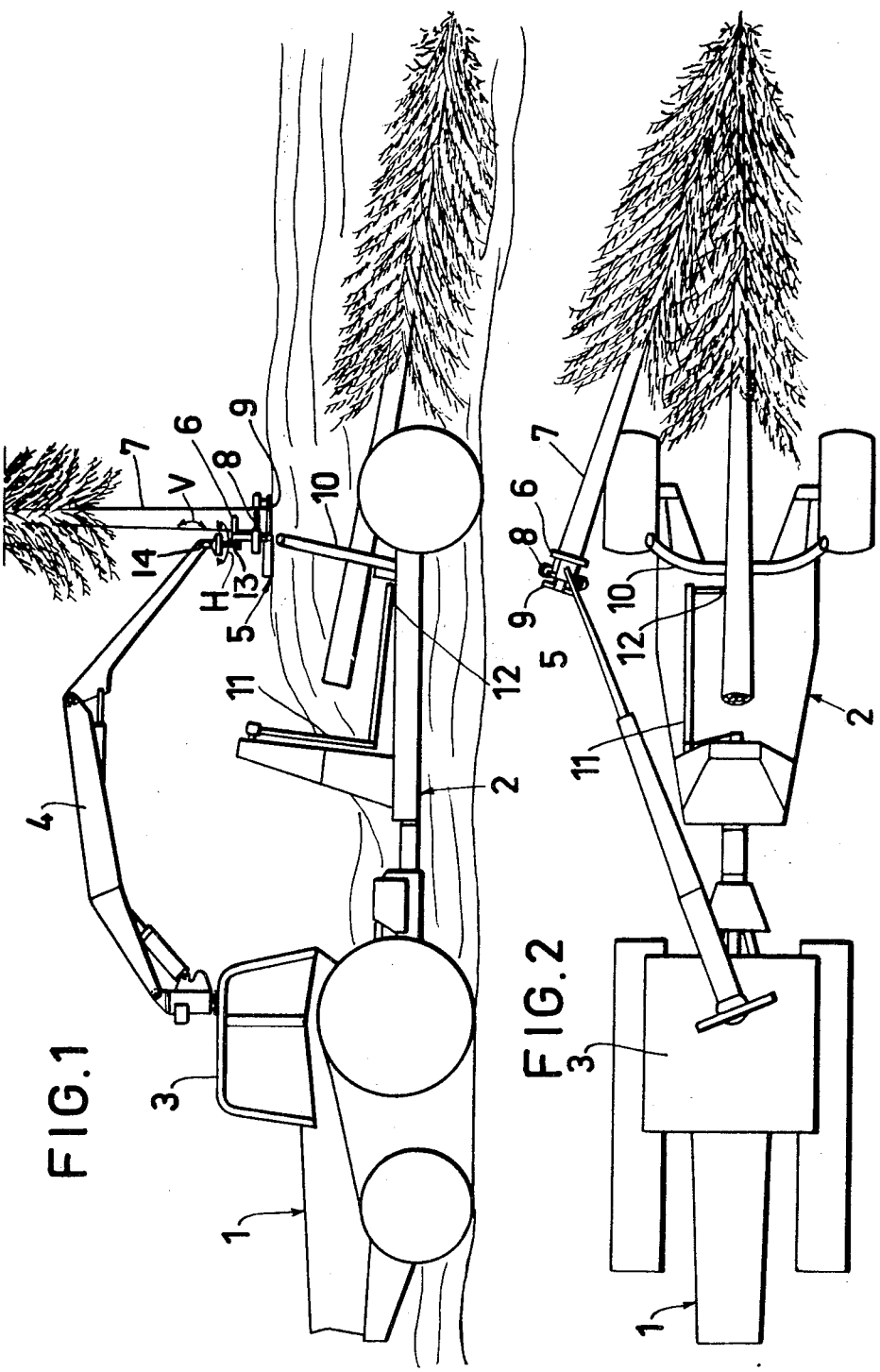

ARRANGEMENT FOR FELLING AND STACKING TREES FOR TRANSPORT

This invention relates to an arrangement for felling and stacking trees to be transported, for example to a processing site, by using a vehicle with a stacking support driven by the vehicle, and a crane boom adapted to be rotated in the horizontal plane as well as to be lifted and lowered and supporting at its end a felling unit.

The conventional method of felling trees and stacking them on a transport support has been since long to place the transport support near a group of trees and to fell the trees one after the other. The only aspect observed during the felling was to arrange for a free fall of the tree. The trees thus felled into more or less random directions are thereafter heaved to the transport support into a position in parallel with the support whereafter they are lifted on to the support and then be bundled. This method obviously is both laborious and time-consuming.

An attempt of radically rationalizing this work was made by the recent development of combined felling, stacking and transport machines. A typical example thereof operates with a boom carrying a combined felling and grapple unit, which subsequent to the felling of a tree is actuated to lift the entire tree and swing it into horizontal position for placing it onto the superstructure of the machine which is formed as a stacking place. The forces to be developed for this work require, of course, extremely sturdy and powerful special machines. Such machines involve high initial and operation costs and, besides, are unwieldy in woods owing to their large dimensions and their extremely heavy weight.

There exists, therefore, a great demand of a method and an arrangement, which eliminate the heavy and tedious manual work (which often requires a whole team) implied in the conventional method and at the same time avoids the disadvantages characteristic of superdimensioned special machines.

This object is achieved by the arrangement according to the invention which is characterized by the combination that the felling unit in a manner known per se is provided with a concave catching portion for catching a tree trunk and with a logging means disposed below and operating in the direction away from said catching portion, that said felling unit is mounted rotatable in the horizontal plane in relation to the boom and adapted for control so as at the logging to cause the top of the tree in question to fall near the rearward extension of the stacking support centerline, thereby rendering it possible that the felled tree automatically is given a good direction when its root end upon upward and inward swing of the felling unit is placed in position on the load bunk.

The invention is described in greater detail in the following, with reference to the accompanying drawing:

FIGS. 1 and 2 in a schematic way show a side view and a horizontal view, respectively, of a preferred embodiment of an arrangement according to the invention.

In the Figures, 1 is a tractor coupled to a sulky 2. The tractor roof 3 supports a hydraulically operated boom 4 rotatable in the horizontal plane, which boom in the Figure is shown to be of three-section design. At the end of the boom a felling unit 5 is mounted so as to be able to swing in the horizontal plane as well as in the vertical plane symmetrically intersecting the unit, as indicated by the arrows H and V around vertical shaft 13 and horizontal shaft 14, respectively. The unit swing in the horizontal plane can be controlled hydraulically. The unit 5, which may be of the type disclosed in Swedish Pat. No. 311,576, includes a concave catching portion 6 for catching a trunk 7, and two hydraulically operated grapple arms 8 adapted safely to embrace the trunk. Below the grapple arms a hydraulically operated cutting mechanism 9 is mounted.

The sulky 2 supports at its rear end a load bunk 10 and at its front end a hydraulically operated spinning arm 11, at the end 12 of which a wire (not shown) from a sulky mounted winch is secured. By the spinning motion of said spinning arm the wire can be swept over a tree load on said bunk 10 and be lashed or bundled by the wire. Said bundling means may advantageously be of the type disclosed in U.S. Pat. No. 3,395,637.

The aforedescribed combination arrangement can be applied as follows.

The vehicle combination comprising the tractor 1 and sulky 2 is driven to a place located centrally in relation to a group of trees to be felled. For reasons of simplicity, in FIG. 1 only one tree is shown. The sulky orientation in relation to the tree group is chosen so that a relatively free space in the rearward extension of the sulky is obtained.

The boom 4 is so extended against the tree that the catching portion 6 of the felling unit 5 catches the trunk 7. This moment is shown in FIG. 1. Thereafter the unit 5 is turned somewhat about the trunk, so that the symmetry vertical plane through the unit intersects the imaginary extension of the sulky centerline at a distance from the unit approximately equal to the estimated length of the tree in question. Experiments have proved that this estimation of the necessary turning of the unit made from the driver's seat is surprisingly easy with some practice. Besides, the setting of the position is not particularly critical. Subsequent to the turning of the unit, its grapple arms 8 are moved so as safely to embrace the trunk, and the cutting mechanism 9 located below is started.

The trunk having been cut off (entirely or to the greater part), the tree is allowed to fall, possibly with assitance by a push of the boom. Owing to the aforesaid direction of the unit 5 and its capacity of swinging in the vertical plane, the tree 7, with its root end still safely embraced by the arms 8, is forced to fall to approximately the position shown in FIG. 2, i.e., with its top near the symmetry line of the sulky. Now remains merely, by assistance of the boom to lift the root end and swing it inwardly over the bunk 10, and possibly to pull forward the tree so as to extend well in agreement with trees already loaded (one such tree is shown in the two figures). When the bunk in this manner has been loaded with logged trees from the nearest vicinity (i.e., within the boom range), the trunks are lashed at the bunk by assistance of the spinning arm 11. Then the vehicle combination is driven to the next felling place where the spinning arm is turned back and the cycle as described above is repeated. When the bunk is loaded to its capacity, the load is transported to a processing station or the like.

It is to be observed that all operations can be carried out by one man from the driver's seat of the tractor, and that the driver always has full control over all steps by direct observation.

The invention is not restricted to the embodiment shown, but a great number of variants are possible within the scope of the invention. It is, for example, not absolutely necessary, that there must be the possibility of separately controlling (forced control) the swing motion of the felling unit in the horizontal plane. The unit, instead, may be mounted freely and its swing about the trunk is effected by a lateral outward swing of the boom proper, as the suspension point of the unit at the boom end is eccentric in relation to the swing center represented by the trunk center. The invention, of course, is not bound to any special design of the felling unit, boom or bundling means, but these details can be varied within very wide limits. The boom, for example, may be of a purely telescopic type or it may be a combination of an articulated and telescopic boom. The vehicle combination, which in the embodiment shown comprises a tractor and a sulky, may, of course, be replaced by any other suitable load vehicle combination of one or several units.

I claim:

1. Apparatus for felling and stacking trees for transport comprising, a vehicle, a felled tree stacking support associated therewith, a boom mounted on said vehicle, means for rotating said boom in a horizontal plane and for moving the end of said boom vertically with respect to said vehicle, a horizontal shaft mounted at the free end of said boom, a felling unit mounted for rotation about said horizontal shaft, said felling unit including a guide member adapted to be seated against a tree trunk, a trunk gripping means and cutting means positioned below and spaced laterally from said guide member and gripping means, a vertical shaft mounted at the free end of said boom, means for mounting said felling unit for rotation in a horizontal plane about said vertical shaft whereby the top of a tree, when felled will fall substantially on the extended centerline of said stacking support, and the root end of the felled tree may be raised and rotated by said boom towards and onto said stacking support to properly locate the felled tree on said stacking support.

2. Apparatus as claimed in claim 1 and further comprising means for controlling rotation of the felling unit about said horizontal shaft and for controlling rotation thereof about said vertical shaft.

* * * * *